(No Model.)

G. A. BRACHHAUSEN.
DAMPING DEVICE FOR MUSIC BOXES.

No. 500,370. Patented June 27, 1893.

WITNESSES:
Frank S. Ober
Charles E. Smith

INVENTOR
Gustav A. Brachhausen,
BY
Briesen & Knauth
his ATTORNEYS.

UNITED STATES PATENT OFFICE.

GUSTAV A. BRACHHAUSEN, OF JERSEY CITY, NEW JERSEY.

DAMPING DEVICE FOR MUSIC-BOXES.

SPECIFICATION forming part of Letters Patent No. 500,370, dated June 27, 1893.

Application filed December 1, 1892. Serial No. 453,713. (No model.)

*To all whom it may concern:*

Be it known that I, GUSTAV ADOLF BRACHHAUSEN, residing at Jersey City, Hudson county, in the State of New Jersey, have invented a new and useful Improvement in Damping Devices for Music-Boxes, of which the following is a full, clear, and exact description, reference being had to the accompanying drawings, in which like letters refer to like parts, and in which—

Figure 1:
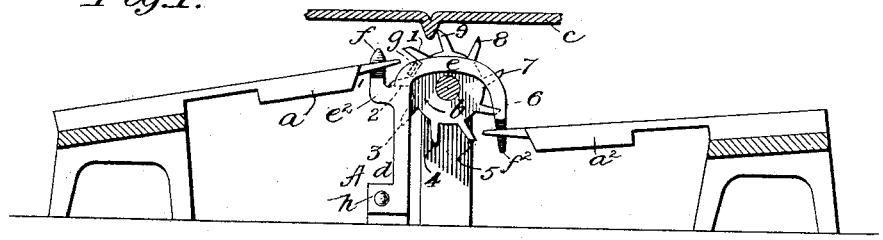
Figure 2:
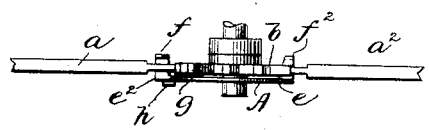
Figure 3:
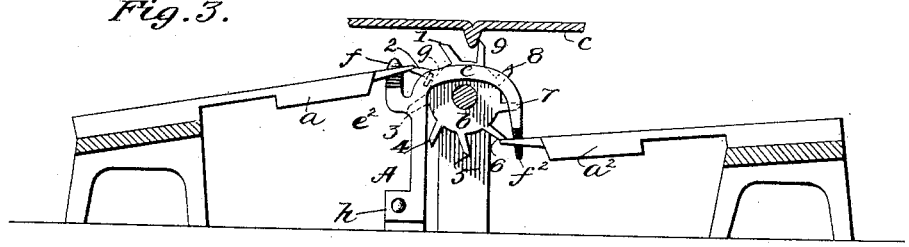
Figure 7:
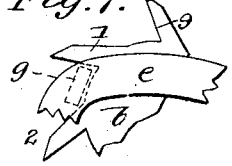
Figure 4:
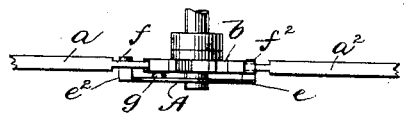
Figure 5:
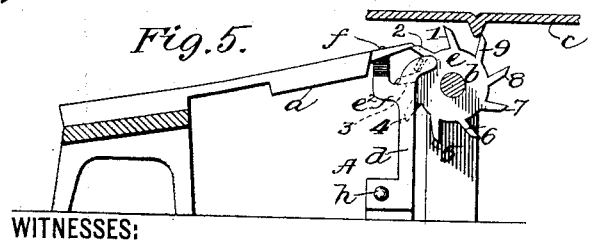
Figure 6:
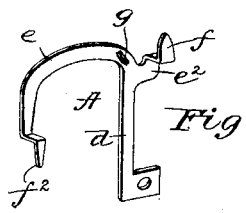

Figure 1 is a side view of my improved damping device. Fig. 2 is a top view of the same. Fig. 3 is a side view of my improved damping device, showing it in a different position from Fig. 1. Fig. 4 is a top view of the same. Fig. 5 is a side view of a modified form of damping device. Fig. 6 is a perspective view of my improved damper. Fig. 7 is an enlarged detail.

My invention relates to dampers for music-boxes; and it consists in the novel arrangement and combination of parts hereinafter set forth and specifically pointed out in the claims.

The object of my invention is to produce a single damper which will damp from the side any suitable number of music-tongues by a positive pressure thereon, and which can be constructed at little cost and with simplicity of parts.

In the drawings, $a$ $a^2$ represent the vibrating tongues of a music-box, of which any suitable number may be used.

$b$ represents a suitable sprocket-wheel for vibrating the tongue or tongues $a$ $a^2$, the arrangement shown in Figs. 1—4 inclusive representing the wheel $b$ as capable of actuating at one time two oppositely placed tongues $a a^2$.

$c$ represents a note-plate or its equivalent for operating the sprocket-wheel $b$.

A is a damper, which is preferably struck up from a piece of spring metal, as shown in Fig. 6, and which consists of the main shank $d$, from which extend two (or more) arms $e e^2$. The arm $e^2$ terminates in a damping finger $f$, and the arm $e$ carries a cam $g$ and may also terminate in a damping finger $f^2$. Figs. 1—4 inclusive show both these damping fingers $f$ and $f^2$. But in Fig. 5 the arm $e$ does not terminate in a damping finger. The damper, after having been struck up as shown in Fig. 6, is suitably fastened as shown at $h$ so that the fingers $f f^2$ are liable to bear against the sides of the tongues $a$ $a^2$. But these fingers are held normally out of contact with said tongues by the spring of the body of the damper, or if said body is not springy, a separate spring having the like effect may be applied to it. When the parts are assembled, the wheel $b$ is between the tongues $a$ $a^2$ and aligned therewith, so that its teeth may strike said tongues. In case of but one tongue, as in Fig. 5, the wheel $b$ is aligned therewith. The damper A is so adjusted that it will stand near one face of said wheel, its cam $g$ being in the periphery occupied by the teeth of the wheel. (See Fig. 7.) The spring of the damper holds this cam into the path of the teeth of the wheel and holds the damper fingers (or finger) normally out of contact with the sides of the tongues (or tongue).

Having described the details of my improved damper, I will now proceed to describe the operation thereof. Supposing that teeth 1 and 5 of the sprocket-wheel $b$ have just vibrated the tongues $a$ $a^2$, as shown in Fig. 1, a further rotation of said sprocket-wheel will force the tooth 2 thereof in contact with the cam $g$ on the damper A, forcing the fingers $f f^2$ thereon in contact with the sides of the tongues $a$ $a^2$, as shown in Figs. 3 and 4. As the wheel $b$ continues to rotate, its tooth 2 first leaves the cam $g$ and then strikes the tongue. Consequently the fingers $f f^2$ of the damper A are out of contact with said tongues $a$ $a^2$ before the same are again vibrated. So it will be seen that the tongues are each time damped before the vibration of the tongues by the next succeeding teeth occurs, and the damping is by positive pressure against the sides of the tongues.

My invention is applicable to any suitable number of tongues and saves much time, labor and expense in the manufacture of music-boxes, over those heretofore constructed, wherein it was necessary to have a separate damping mechanism for each tongue, and with less liability of breakage.

Having described my invention, what I claim, and desire to secure by Letters Patent, is—

1. A damper for music-boxes consisting of the main spring body portion $d$, arm or arms $e$ $e^2$ provided with damping fingers $f$ $f^2$ adapted to bear against the sides of the tongue or tongues to be damped and cam $g$, as and for the purpose described.

2. A multiple damper for music-boxes consisting of a body struck up from a single piece having main spring body portion $d$, arms $e\ e^2$, damping fingers $f\ f^2$ and cam $g$, combined with sprocket-wheel $b$, vibrating tongues $a\ a^2$ and means for operating said wheel $b$, whereby one damper will be operated to damp a plurality of vibrating tongues from the sides thereof, substantially as and for the purpose specified.

3. The combination of the tongue $a$ with the sprocket-wheel $b$ aligned therewith, and with the damper A, said damper having cam $g$ and damping finger or fingers, said cam and finger or fingers projecting from the same face of the damper so that when the cam is crowded sidewise by a tooth of the sprocket-wheel, the damping finger or fingers will be pressed into action, as specified.

4. The combination of the tongue or tongues $a\ a^2$ with the sprocket-wheel $b$ aligned therewith and damper A, said damper having cam $g$ facing one side of the teeth of the sprocket-wheel, and damping finger or fingers facing the opposite side of the tongue or tongues, substantially as described.

5. As a new article of manufacture, a damper for music-boxes, the same being provided with two arms $e\ e^2$, each having damping finger, all arranged so that by the same damper two tongues can be damped simultaneously, substantially as and for the purpose described.

GUSTAV A. BRACHHAUSEN.

Witnesses:
HARRY M. TURK,
CHARLES E. SMITH.